United States Patent
Quay et al.

(10) Patent No.: US 10,831,971 B1
(45) Date of Patent: Nov. 10, 2020

(54) NET LAYER PROMOTION WITH SWAP CAPABILITY IN ELECTRONIC DESIGN

(71) Applicant: International Business Machines Corporation, Armonk, NY (US)

(72) Inventors: Stephen Thomas Quay, Vancouver (CA); Yaoguang Wei, Austin, TX (US); Bijian Chen, Austin, TX (US); Ying Zhou, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/431,974

(22) Filed: Jun. 5, 2019

(51) Int. Cl.
| G06F 17/50 | (2006.01) |
| G06F 30/394 | (2020.01) |
| G06F 30/392 | (2020.01) |
| G06F 119/12 | (2020.01) |

(52) U.S. Cl.
CPC .......... *G06F 30/394* (2020.01); *G06F 30/392* (2020.01); *G06F 2119/12* (2020.01)

(58) Field of Classification Search
None
See application file for complete search history.

(56) References Cited

U.S. PATENT DOCUMENTS

| 6,958,545 | B2* | 10/2005 | Kotecha | G06F 30/394 |
| | | | | 257/758 |
| 7,480,885 | B2* | 1/2009 | Frankle | G06F 30/394 |
| | | | | 716/129 |
| 7,853,915 | B2* | 12/2010 | Saxena | G06F 30/394 |
| | | | | 716/129 |
| 7,895,557 | B2* | 2/2011 | Alpert | G06F 30/327 |
| | | | | 716/114 |
| 8,151,228 | B2* | 4/2012 | Ramachandran | G06F 30/327 |
| | | | | 716/106 |
| 8,443,324 | B2* | 5/2013 | Alpert | G06F 30/394 |
| | | | | 716/126 |
| 9,003,344 | B2* | 4/2015 | Kennedy | G06F 30/398 |
| | | | | 716/110 |

(Continued)

OTHER PUBLICATIONS

Y. Zhou et al., "Congestion Based Layer Assignment of Global Routing," 2003 IEEE, pp. 216-220. (Year: 2003).*

(Continued)

*Primary Examiner* — Leigh M Garbowski
(74) *Attorney, Agent, or Firm* — Erik Johnson; Otterstedt, Wallace & Kammer, LLP

(57) ABSTRACT

Methods and systems for improving the performance of a computer performing an electronic design. One or more nets of a netlist are sorted based on an amount of slack and a net of the one or more nets that is unprocessed and that has a least amount of slack is selected as a current target net. A layer of a higher bucket that is unprocessed for the currently selected target net is selected, the higher bucket being higher than a bucket of the current target net. A determination of whether capacity is available to route the current target net on the selected layer of the higher bucket is made and the current target net is routed on the selected layer of the higher bucket in response to capacity being available. One or more nets that are competing for resources with the current target net on the selected layer of the higher bucket are identified as candidate nets in response to capacity not being available.

20 Claims, 12 Drawing Sheets

(56) References Cited

U.S. PATENT DOCUMENTS

| | | | |
|---|---|---|---|
| 9,223,918 | B2 | 12/2015 | Kartschoke et al. |
| 9,384,316 | B2 | 7/2016 | Folberth et al. |
| 9,436,793 | B2* | 9/2016 | Lin .................... G06F 30/398 |
| 9,514,265 | B2 | 12/2016 | Berry et al. |
| 9,659,133 | B2* | 5/2017 | Lin .................... G06F 30/394 |
| 9,767,239 | B1 | 9/2017 | Buck et al. |
| 9,858,383 | B2 | 1/2018 | Kalafala et al. |
| 9,922,158 | B2 | 3/2018 | Pandey et al. |
| 10,353,841 | B2* | 7/2019 | Daellenbach ....... G06F 13/4022 |
| 10,360,341 | B2* | 7/2019 | Chakraborty ......... G06F 30/394 |
| 10,599,882 | B1* | 3/2020 | Werkheiser ........... G06F 30/394 |
| 2007/0028201 | A1* | 2/2007 | Mehrotra .............. G06F 30/394 716/129 |
| 2017/0206286 | A1* | 7/2017 | Lee ....................... G06F 30/394 |
| 2018/0203064 | A1 | 7/2018 | Antony et al. |
| 2019/0065656 | A1* | 2/2019 | Chakraborty ......... G06F 30/398 |

OTHER PUBLICATIONS

T.-H. Lee et al., "Congestion-Constrained Layer Assignment for Via Minimization in Global Routing," IEEE Trans. on Computer-Aided Design of Integrated Circuits and Systems, vol. 27, No. 9, Sep. 2008, pp. 1643-1656. (Year: 2008).*

Z. Li et al., "Fast Interconnect Synthesis with Layer Assignment," ACM ISPD 2008, pp. 71-77. (Year: 2008).*

M. Moffitt, "MAIZEROUTER: Engineering an Effective Global Router," IEEE Trans. on Computer-Aided Design of Integrated Circuits and Systems, vol. 21, No. 11, Nov. 2008, pp. 2017-2026. (Year: 2008).*

T.-H. Wu et al., "GRIP: Global Routing vi Integer Programming," Ieee Trans. on Computer-Aided Design of Integrated Circuits and Systems, vol. 30, No. 1, Jan. 2011, pp. 72-84. (Year: 2011).*

Y. Wei et al., "CATALYST: Planning Layer Directives for Effective Design Closure," 2013 EDAA, 6 pages. (Year: 2013).*

D. Liu et al., "Incremental Layer Assignment for Critical Path Timing," ACM DAC 2016, 6 pages. (Year: 2016).*

M. Darmi et al., "Integrated Circuit Conception: A Wire Optimization Technic Reducing Interconnection Delay in Advanced Technology Nodes," Electronics 2017, vol. 6, No. 78, 11 pages. (Year: 2017).*

V. Livramento et al., "Incremental Layer Assignment Driven by an External Signoff Timing Engine," IEEE Trans. on Computer-Aided Design of Integrated Circuits and Systems, vol. 36, No. 7, Jul. 2017, pp. 1126-1139. (Year: 2017).*

L. Cherif et al., "Layer Optimization for Power Reduction in Integrated Circuits," 2018 IEEE, pp. 625-629. (Year: 2018).*

Jiang Hu et al., "A timing-constrained simultaneous global routing algorithm," IEEE Transactions on Computer-Aided Design of Integrated Circuits and Systems, vol. 21, No. 9, 2002: 1025-1036.

Cengiz Alkan et al., "Routing-tree construction with concurrent performance, power and congestion optimization," IEEE Computer Society Annual Symposium on Emerging VLSI Technologies and Architectures, 2006., 6 pp.

Yaoguang Wei et al., "CATALYST: planning layer directives for effective design closure." Proceedings of the Conference on Design, Automation and Test in Europe, 2013, pp. 1873-1878.

* cited by examiner

|  | wACE4 | Worst Slack | TNS | #Neg |
|---|---|---|---|---|
| Improve | -1% | 30.52% | 6.15% | 0.39% |

NET LAYER PROMOTION WITH SWAP CAPABILITY IN ELECTRONIC DESIGN

BACKGROUND

The present invention relates to the design of integrated circuits (ICs), and more specifically, to the placement, routing, and analysis of such circuits.

In VLSI (very large scale integration) digital design, a netlist generated from logic synthesis includes a network of combinational logic gates, memory elements (such as latches and flip-flops), and the like. The placement stage determines the locations of all modules generated from logic synthesis. The routing stage determines the location and routes of all nets in the netlist. Typically, primary objectives of placement and routing are to optimize wire length and wire cross-sectional area, and to meet timing constraints related to the propagation delay of signals over the interconnects.

SUMMARY

Principles of the invention provide techniques for net layer promotion with swap capability in electronic design. In one aspect, an exemplary method includes the operations of sorting one or more nets of a netlist based on an amount of slack; selecting, as a current target net, a net of the one or more nets that is unprocessed and that has a least amount of slack; selecting a layer of a higher bucket that is unprocessed for the currently selected target net, the higher bucket being higher than a bucket of the current target net; determining if capacity is available to route the current target net on the selected layer of the higher bucket; routing the current target net on the selected layer of the higher bucket in response to capacity being available; and identifying, as candidate nets, one or more nets that are competing for resources with the current target net on the selected layer of the higher bucket in response to capacity not being available.

In one aspect, a computer includes a memory; and at least one processor, coupled to the memory, and operative to perform operations including sorting one or more nets of a netlist based on an amount of slack; selecting, as a current target net, a net of the one or more nets that is unprocessed and that has a least amount of slack; selecting a layer of a higher bucket that is unprocessed for the currently selected target net, the higher bucket being higher than a bucket of the current target net; determining if capacity is available to route the current target net on the selected layer of the higher bucket; routing the current target net on the selected layer of the higher bucket in response to capacity being available; and identifying, as candidate nets, one or more nets that are competing for resources with the current target net on the selected layer of the higher bucket in response to capacity not being available.

In one aspect, non-transitory computer readable medium includes computer executable instructions which when executed by a computer performing electronic design analysis cause the computer to perform a method which improves the performance of the computer, the method including operations of sorting one or more nets of a netlist based on an amount of slack; selecting, as a current target net, a net of the one or more nets that is unprocessed and that has a least amount of slack; selecting a layer of a higher bucket that is unprocessed for the currently selected target net, the higher bucket being higher than a bucket of the current target net; determining if capacity is available to route the current target net on the selected layer of the higher bucket; routing the current target net on the selected layer of the higher bucket in response to capacity being available; and identifying, as candidate nets, one or more nets that are competing for resources with the current target net on the selected layer of the higher bucket in response to capacity not being available.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) (e.g., a computer) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide one or more of the following advantages:

improved integrated circuit performance due to the routing of higher performance interconnects (nets);

improved integrated circuit design density (fewer layers of metal are required when the design interconnect is effectively exploited to meet timing constraints, improving chip manufacturing yields and costs to manufacture);

reduced design cycle time due to higher performance techniques for routing netlists;

reduced cost to design high performance integrated circuits (eliminates need to manually edit the routing layout);

improved interconnect assignment to VLSI buckets and layers;

improved performance of a computer carrying out Electronic Design Automation (EDA) because the analysis will converge faster and use less CPU time; and improved performance of integrated circuits designed using aspects of the invention, as compared to those not designed using aspects of the invention, at least under conditions where there is the same CPU time budget for the design process.

These and other features and advantages of the present invention will become apparent from the following detailed description of illustrative embodiments thereof, which is to be read in connection with the accompanying drawings.

BRIEF DESCRIPTION OF THE DRAWINGS

FIG. 8 is a table illustrating test results of performing promotion with swap and promotion without swap, in accordance with an example embodiment;

DETAILED DESCRIPTION

One or more embodiments advantageously provide techniques for assigning nets to buckets where the buckets identify layers of a VLSI design having similar net specifications.

Figure 1A:
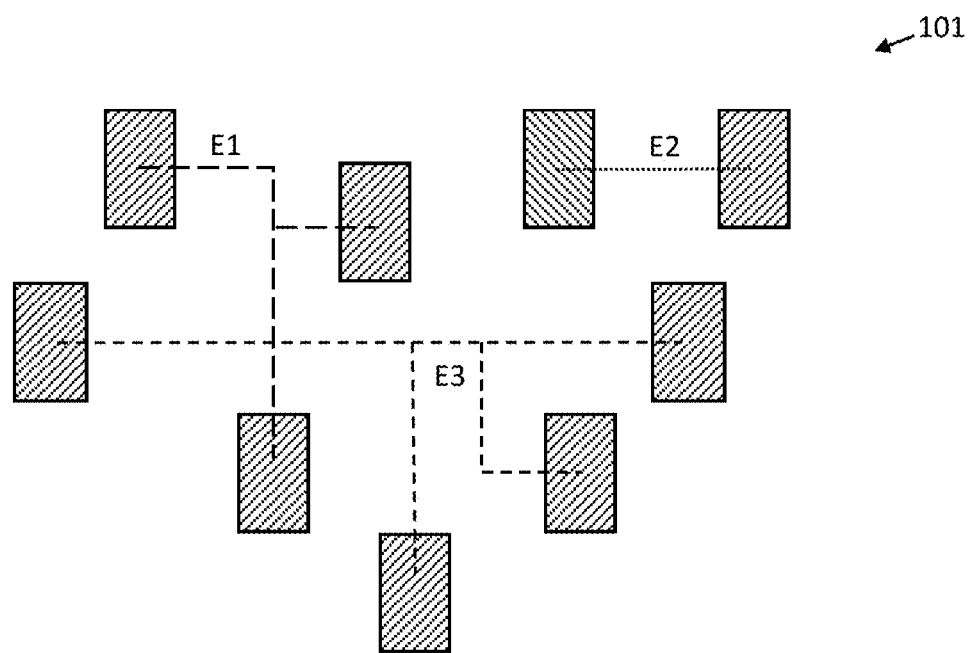
FIG. 1A illustrates a circuit where placement is represented as a set of rectangles or blocks.

FIG. 1A illustrates a circuit 101 where placement is represented as a set of rectangles or blocks. Referring to FIG. 1A, the set of rectangles or blocks (shown cross-hatched and not separately numbered to avoid clutter) have given widths and heights which must fit into a bounding box (outer rectangle not separately numbered to avoid clutter). This set is denoted by V. In addition to V itself, a number of subsets of V: E1, E2 . . . Em (in the figure, E1, E2, E3) are given and are called nets. Blocks of each net should be connected by wires (lines shown connecting cross-hatched rectangles and not separately numbered to avoid clutter). A good placement should minimize the total wire length without creating regions overpopulated with blocks anywhere in the design.

Figure 1B:
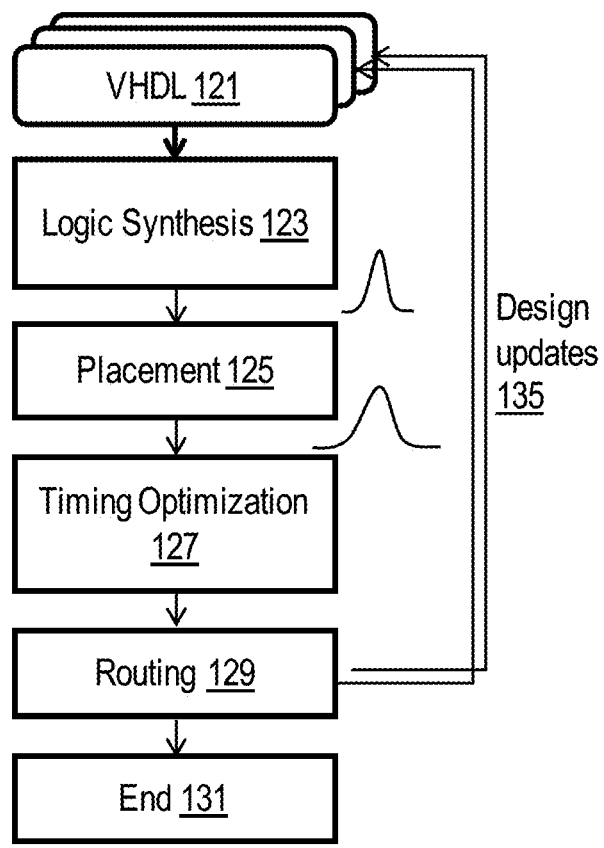
FIG. 1B depicts a simplified physical synthesis flow, in accordance with an example embodiment.

FIG. 1B depicts a simplified physical synthesis flow, in accordance with an example embodiment. In VLSI digital design, a netlist (from logic synthesis) includes a network of combinational logic gates and memory elements such as latches/flip-flops. In step 121, the design is described in a language such as VHDL. In step 123, logic synthesis is carried out. In step 125, the placement is carried out. Regarding placement, the netlist is presented as sea-of-standard cells (nodes) with connectivity matrix (edges) for placement during physical design. The placement determines the location of cells with the objective to optimize wire length, cross-sectional area, and propagation delay/slack, while spreading cells to resolve overlaps and meet the density constraint. In step 127, timing optimizations are carried out. In one or more embodiments, routing step 129 is enhanced by the techniques disclosed herein.

One or more embodiments advantageously focus on the routing step 129. The routing step 129 determines the location and route of all nets in the netlist (interconnect(s)). In one or more embodiments, primary objectives of the routing step 129 are to optimize wire length and cross-sectional area, and to optimize the performance of the interconnect, subject to, for example, the constraint of no overlap(s) between modules and various signal timing considerations. In one example embodiment, steps 121 through 129 are repeated to update the design to, for example, meet timing constraints related to the propagation delay of signals over the interconnects (design updates 135). Once all timing constraints are met, the physical synthesis flow of FIG. 1B ends (step 131).

Figure 2:
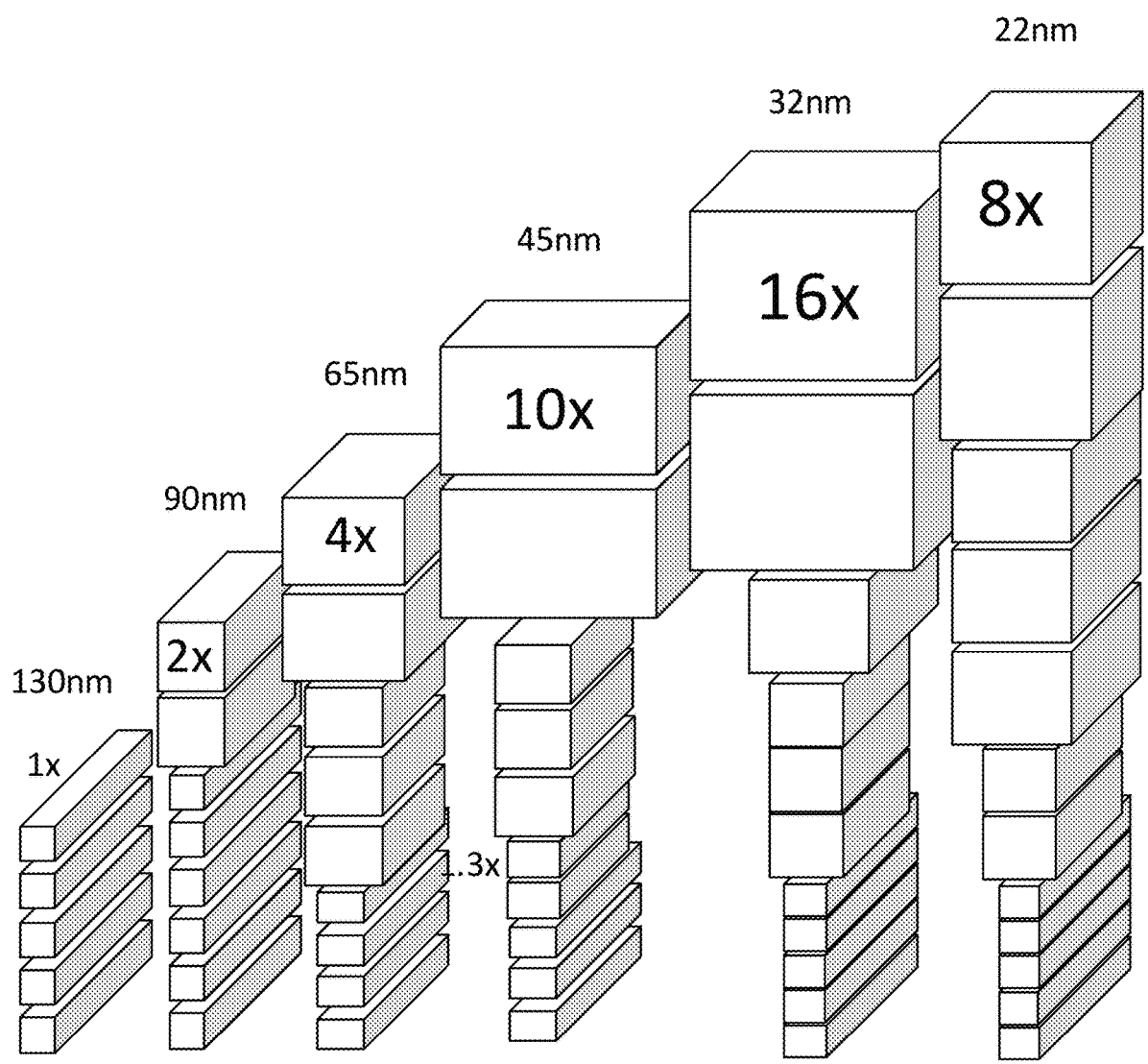
FIG. 2 illustrates graphical representations of the typical size of wire interconnects for different technologies on different layers.

FIG. 2 illustrates graphical representations of the typical size of wire interconnects for different technologies (such as 130 nanometer (nm), 90 nm, and the like) on different layers. In the example of 130 nm technology, the wire interconnects at all five displayed layers have the same height and width, and thus similar electrical characteristics. (It is noted that the five layers are classified as a single bucket since the wire interconnects have the same height and width, and similar electrical characteristics, such as similar resistance-capacitance (RC) characteristics.) At narrower technologies (i.e. progressing from 130 nm technology at the left down to 22 nm technology at the right), the wire interconnects at higher buckets have progressively larger cross-sectional area and thus typically exhibit higher performance (such as a faster propagation speed) per unit length. A two times wider/thicker interconnect exhibits a 4-5 times reduction in resistance (although often a higher level of capacitance and with a need for an appropriately stronger signal driver). Thus, it is often advantageous to assign wire interconnects having critical characteristics (such as critical time constraints) to a layer of a higher bucket, or to promote an interconnect from a lower bucket to an upper bucket.

In one example embodiment, interconnects are identified for promotion based on a variety of constraints and conditions. If room does not exist to promote an interconnect, one or more interconnects are identified for demotion, based on a variety of constraints and conditions, to make space for the promotion. In some circumstances, a trade-off between reducing delay and reducing congestion is necessary.

Figure 3:
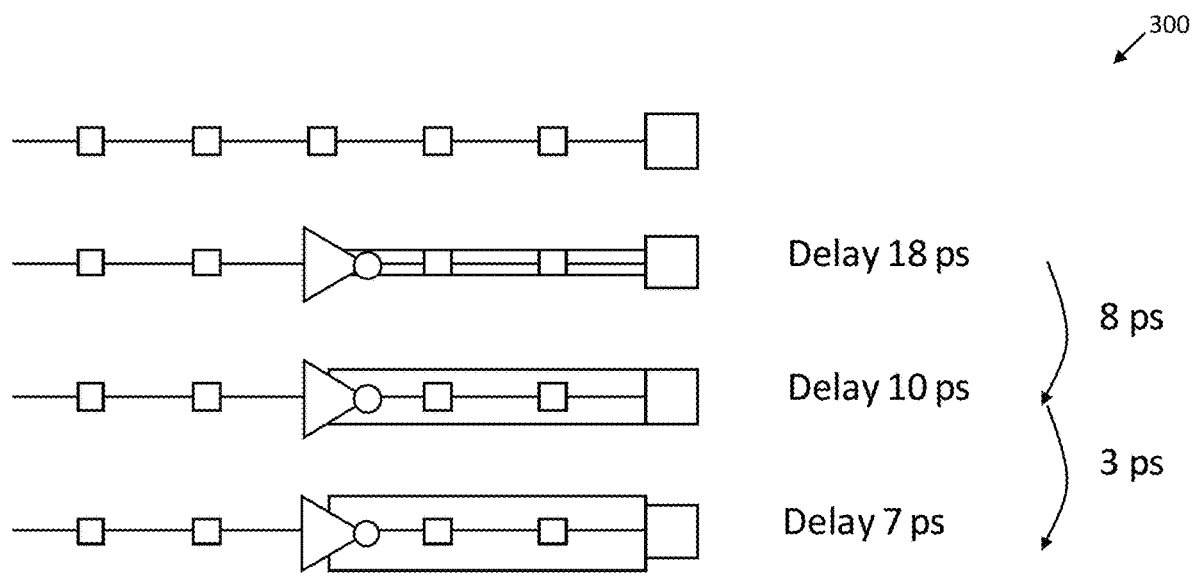
FIG. 3 illustrates the effect on propagation delay of promoting an interconnect to a layer of a higher bucket, in accordance with an example embodiment.

FIG. 3 illustrates the effect on propagation delay of promoting an interconnect to a layer of a higher bucket, in accordance with an example embodiment. As illustrated in diagram 300 of FIG. 3, buckets having layers with smaller interconnect sizes are located toward the top of the figure and buckets having layers with larger interconnect sizes are located toward the bottom of the figure. Inverters or buffers along the path may also be used to reduce the propagation delay. Thus, an interconnect utilizing an inverter in the second bucket exhibits a propagation delay of 18 picoseconds (ps). Promoting the interconnect to the next higher bucket reduces the propagation delay by 8 ps to 10 ps. Promoting the interconnect further, to the next higher bucket, reduces the propagation delay by an additional 3 ps to 7 ps.

Figure 4:
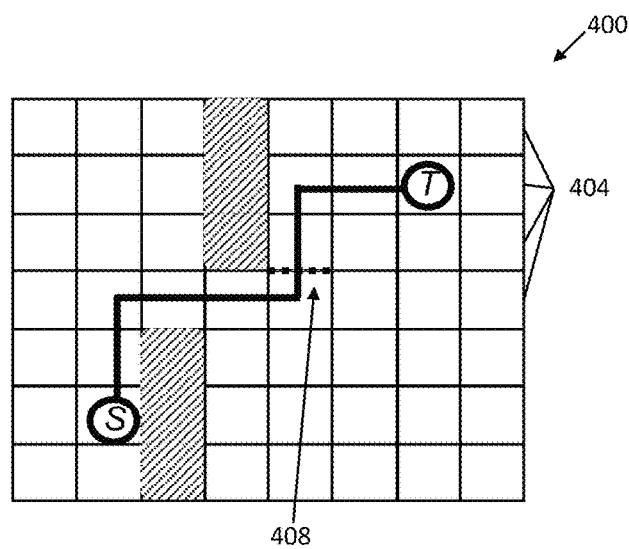
FIG. 4 illustrates a technique for optimizing the routing of interconnects in a VLSI design, in accordance with an example embodiment.

FIG. 4 illustrates a technique for optimizing the routing of interconnects in a VLSI design, in accordance with an example embodiment. As illustrated in FIG. 4, a layer 400 is segmented into tiles 404 and the number of nets allowed to cross an edge of a tile is limited based on, for example, the cross-sectional area of the interconnects and the size of the tile. As noted above, promotion of an interconnect to a higher bucket may not be feasible if there is no room for the interconnect in a layer of the higher bucket. Overflow is defined as a count of excess interconnects (tracks) required to route the wires across a particular edge of a tile 404. The total overflow is defined as the summation of the count of overflows for an interconnect along its entire path. For example, ten tracks may need to cross the dashed edge 408, but the edge capacity is eight, so the overflow is two for this edge.

Figure 5A:
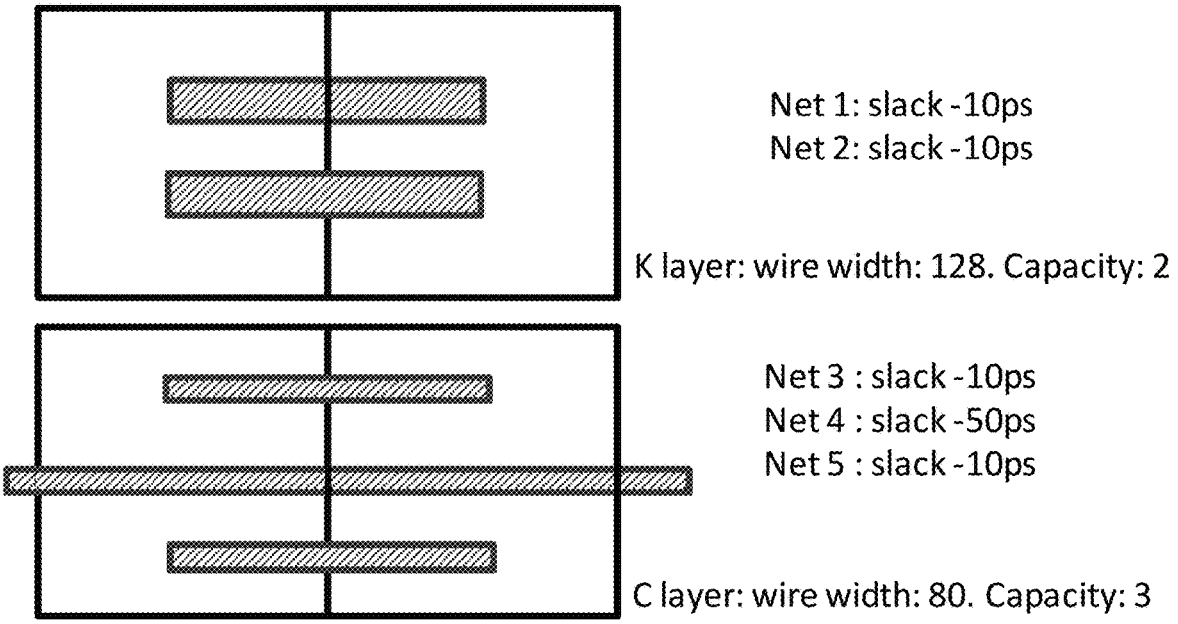
FIG. 5A illustrates interconnects crossing edges of a tile at layers of two different buckets, in accordance with an example embodiment.

FIG. 5A illustrates interconnects crossing edges of a tile 404 at layers of two different buckets, in accordance with an example embodiment. A k layer at the top of FIG. 5A has two interconnects crossing a tile edge: Net 1 and Net 2. Net 1 and Net 2 have a wire width of 128 nm and each have a slack of −10 ps (meaning the corresponding signal is propagating to its sink 10 ps too late to meet timing requirements). The k layer has a capacity of two 128 nm interconnects. Thus, although there is no overflow, there is no capacity for an additional interconnect.

A c layer at the bottom of FIG. 5A has three interconnects crossing a tile edge: Net 3, Net 4, and Net 5. Nets 3-5 have a wire width of 80 nm. Nets 3 and 5 have a slack of −10 ps and Net 4 has a slack of −50 ps. The c layer has a capacity of three 80 nm interconnects. Thus, although there is no overflow, there is no capacity for an additional interconnect.

Net 4 is considered a time-critical net due to the −50 ps slack which is among the worst performing nets from a slack perspective. Since Net 4 has a relatively large deficit of slack compared to the other interconnects, it may prove advantageous to promote Net 4 to the k layer; thus, Net 4 is designated as a target net. The k layer, however, does not have capacity for an additional net. Thus, an evaluation of the effects of demoting one of the interconnects on the k layer and promoting Net 4 is performed to determine if the overall results are satisfactory, that is, to determine, for example, if the cumulative savings in slack over all nets is significant enough to justify the promotion/demotion without significantly increasing net congestion.

In one example embodiment, the interconnects that are candidates for demotion are determined based on various conditions. For example, an interconnect may be a candidate for demotion if the interconnect is competing with the target net for the resources of a layer of a higher bucket. A candidate may be demoted, for example, if a smaller timing/delay degradation would be suffered by demoting the net compared with the timing/delay gain achieved by promoting the target net to a layer of a higher bucket.

Figure 5B:
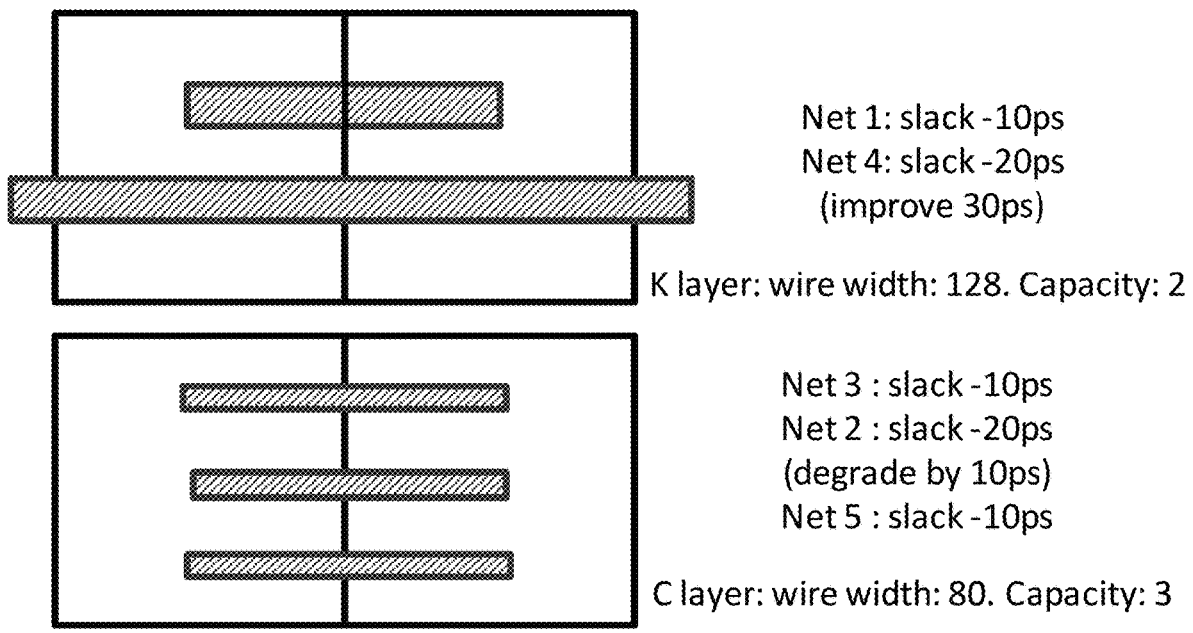
FIG. 5B illustrates the interconnects of FIG. 5A after promoting the target net and demoting a candidate net, in accordance with an example embodiment.

FIG. 5B illustrates the interconnects of FIG. 5A after promoting the target net and demoting a candidate net, in accordance with an example embodiment. Net 4 has been promoted to the k layer and Net 2 has been demoted to the c layer. The slack deficit of Net 4 was reduced by 30 ps and the slack deficit of Net 2 was increased by a smaller 10 ps, giving an overall net improvement of 20 ps (30 ps minus 10 ps). Moreover, there is no overflow and no change in congestion.

It is noted that VLSI designers often set "an ultimate design goal" and one or more "intermediate design goals" utilizing electronic design tools. For example, an ultimate design goal may be to route a design with no nets having a slack worse than 0 ps and an intermediate goal of a design with no nets having a slack worse than −10 ps. In one example embodiment, nets are searched for that are furthest from reaching the intermediate (temporary) goal, as described more fully below in conjunction with FIGS. 6A and 6B. In one example embodiment, a threshold may be defined specifying an amount of improvement (such as 1 ps, 10 ps, or 20 ps) that would justify implementing a change to the routing design, such as a change in assignment of nets to different layers. It is noted, however, that it can be computationally expensive to fully evaluate the results of promoting and demoting nets. Thus, the operations of the disclosed methods incorporate mechanisms to reduce the computational cost.

Figure 6A:
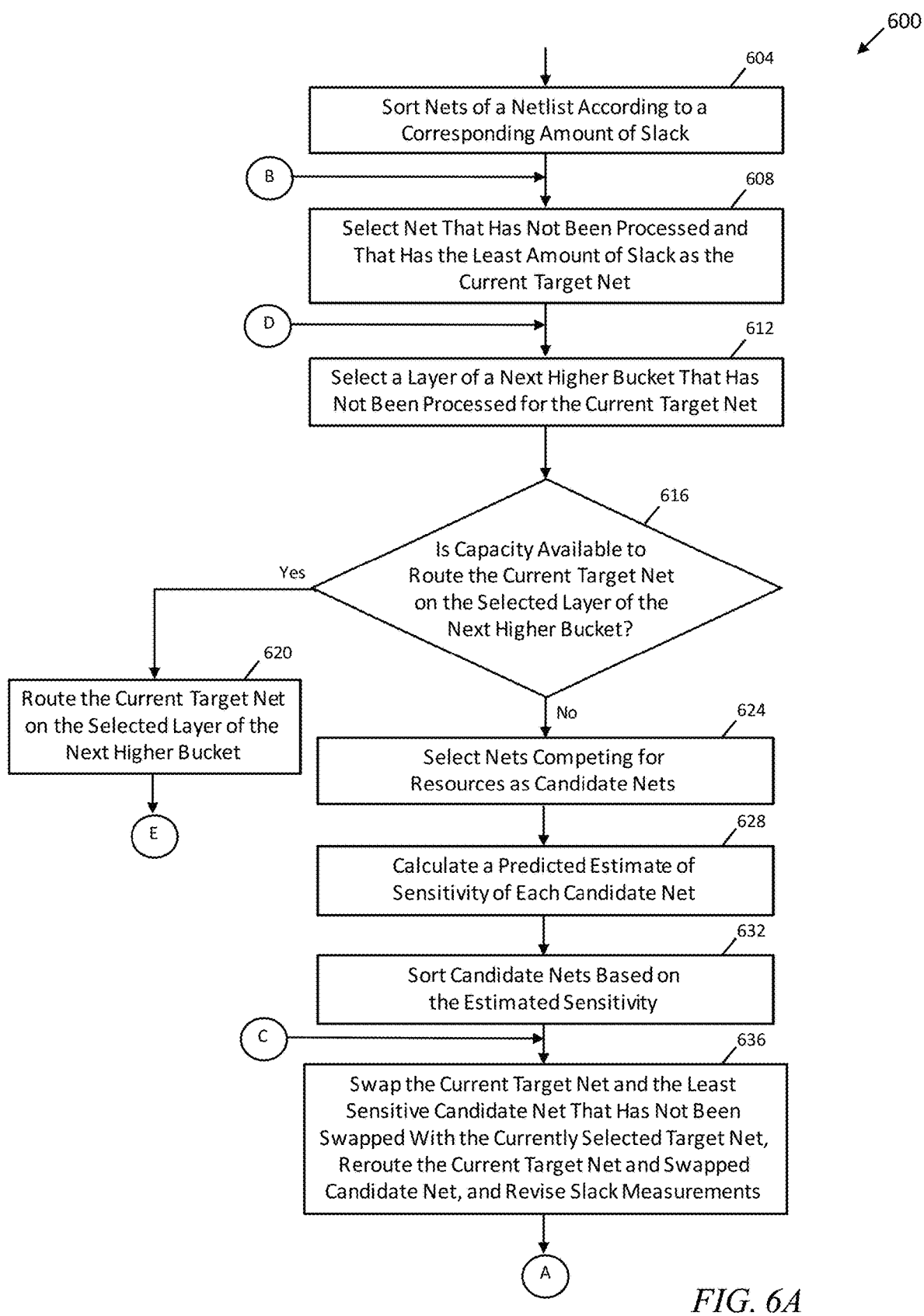
FIGS. 6A and 6B are a flowchart of an example method for optimizing the routing of a VLSI design, in accordance with an example embodiment.
Figure 6B:
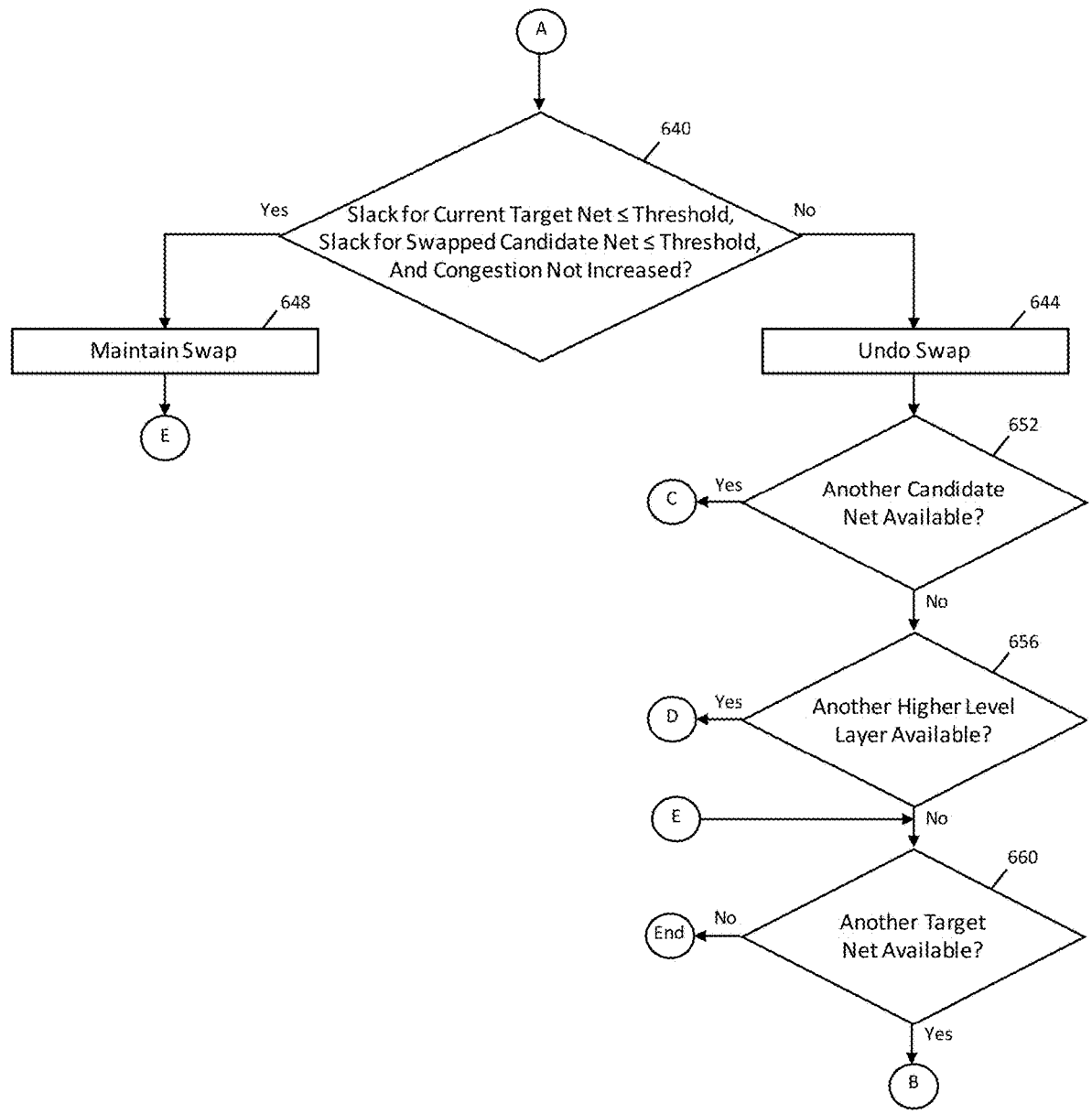

FIGS. 6A and 6B are a flowchart of an example method 600 for optimizing the routing of a VLSI design, in accordance with an example embodiment. In one example embodiment, the nets of a netlist are sorted according to their amount of slack in an order of decreasing slack (operation 604). The net having the least relative amount of slack that has not been processed by method 600 is selected as the current target net (operation 608) and a layer of a next higher bucket (relative to the bucket of the current target net) that has not yet been processed by method 600 for the currently selected target net is selected (operation 612). A check is performed to determine if capacity is available to route the current target net on the selected layer of the next higher bucket (decision block 616). If capacity is available (YES branch of decision block 616), the current target net is rerouted on the selected layer of the next higher bucket (operation 620) and the method 600 proceeds with operation 660. If capacity is not available (NO branch of operation 616), the nets that are competing for resources with the current target net are selected as candidate nets (operation 624). A predictive estimate of the sensitivity of each candidate net is calculated (operation 628). The estimate is the predicted change in the slack that would be encountered by demoting the candidate net to the layer of the current target net, to another layer of the same bucket as the current target net, or to a layer of a lower bucket than the bucket of the current target net, as described more fully below in conjunction with FIG. 7. The candidate nets are sorted by the sensitivity (the predicted change in slack) of each candidate net in an order of a decreasing amount of slack (operation 632). Shorter nets, for example, are usually less sensitive (exhibit a smaller change in slack) than longer nets. In addition to the length of the net, the sensitivity may also be impacted by a count of sinks on the net, the topology of the net, a change in capacitance on the net, and the strength of the signal driver on the net. In one example embodiment, as described more fully below, an incremental parasitic extraction predicts the resistance-capacitance (RC) model of the interconnect from a source to each sink, as described more fully below in conjunction with FIG. 7.

Once the candidate nets are sorted, a swap of the currently selected target net with the least sensitive candidate net (that has not yet been swapped with the currently selected target net) is performed, the incremental global router reroutes the layout, and the slack measurements for the current target net and the swapped candidate net are revised (operation 636). A check is performed to determine if the slack for the current target net, the slack for the swapped candidate net, and the resulting congestion (such as tile edge overflow) satisfies the specified swap criteria (decision block 640). In one example embodiment, the swap criteria is an improvement in the overall slack of at least a specified design threshold (such as 30%, 20 ps, and the like). In one example embodiment, the swap criteria is that the slack for the current target net and the slack for the swapped candidate net are at or below a specified slack threshold (such as 10 ps). In one example embodiment, the swap criterion is also based on a reduction in congestion (tile edge overflow) or a lack a degradation in the congestion. Given the teachings herein, the skilled artisan can select appropriate thresholds. In one or more embodiments, if more than one edge is at capacity for a selected net, handle one edge at a time, and try all nets one at a time.

If the swap criteria is not satisfied (NO branch of decision block 640), the swap is undone (operation 644) and the method 600 proceeds with decision block 652; otherwise (YES branch of decision block 640), the swap is maintained (operation 648) and the method 600 proceeds with operation 660.

In decision block 652, a check is performed to determine if another candidate net is available. If another candidate net is not available (NO branch of decision block 652), the method 600 proceeds with decision block 656; otherwise (YES branch of decision block 652), the method 600 proceeds with operation 636.

In decision block 656, a check is performed to determine if another higher level layer is available. If another higher level layer is not available (NO branch), the method 600 proceeds with decision block 660; otherwise (YES branch), the method 600 proceeds with operation 612.

In decision block 660, a check is performed to determine if another target net is available. If another target net is not available (NO branch of decision block 660), the method 600 ends; otherwise (YES branch of decision block 660), the method 600 proceeds with operation 608.

In one example embodiment, the method 600 ends when no target nets are available, as illustrated in FIG. 6B. No target nets may be available when 1) a design goal has been met; 2) the method 600 has run for a specified amount of time; 3) the count of nets that have been processed as target nets exceeds a threshold count; 4) the improvement in a design goal is no longer significant (such as improvements in slack of 3 ps or less); and the like.

Figure 7:
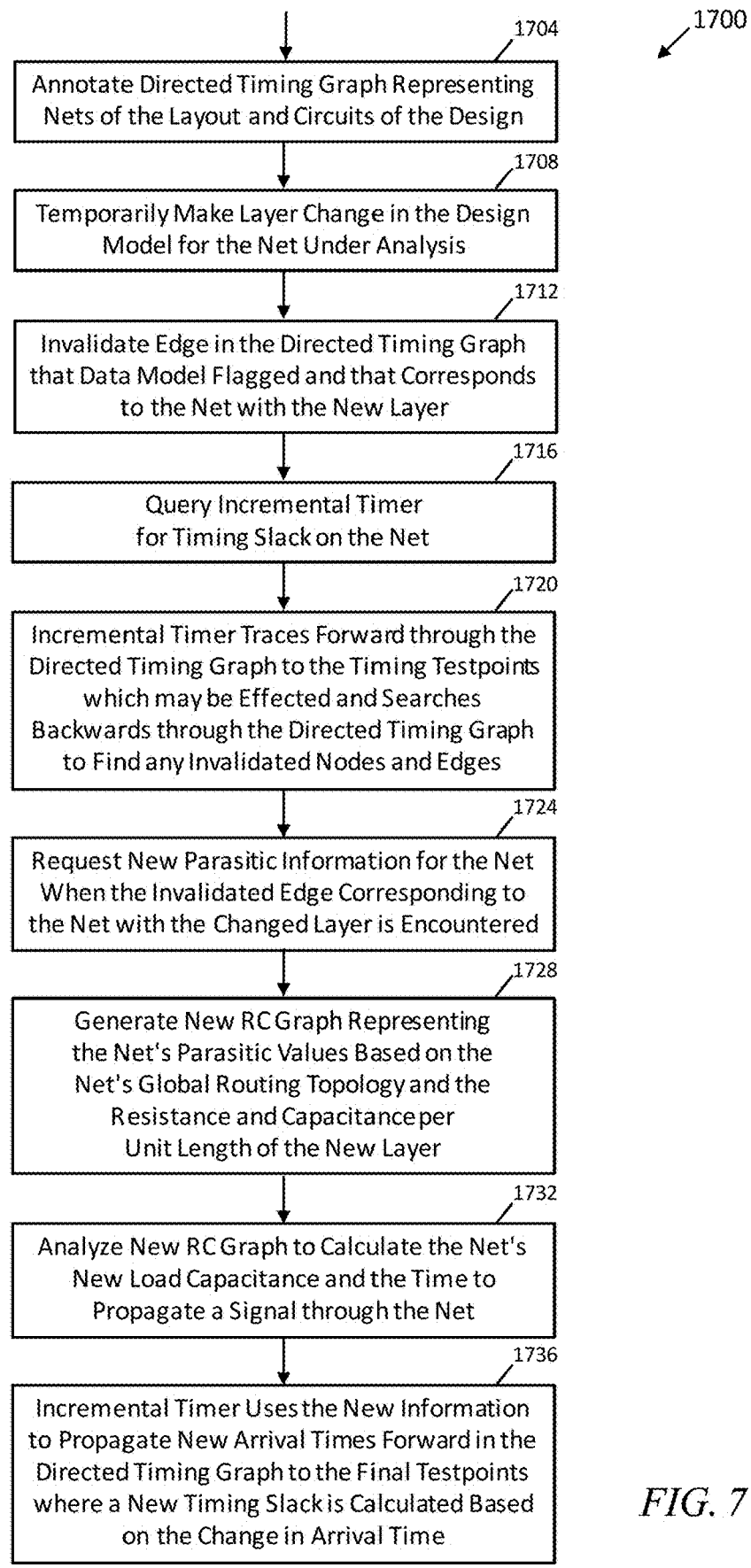
FIG. 7 is a flowchart of an example method for estimating a predicted change in slack that would be encountered by demoting a candidate net, in accordance with an example embodiment.

FIG. 7 is a flowchart of an example method 1700 for estimating a predicted change in slack that would be encountered by demoting a candidate net, in accordance with an example embodiment. In one example embodiment, to determine the timing sensitivities and verify the impact on slack, the method 600 relies on an incremental parasitic and timing analysis integrated into the physical design synthesis environment. (See, for example, L. Trevillyan, D. Kung, R. Puri, L. N. Reddy, and M. A. Kazda, "An integrated environment for technology closure of deep-submicron IC designs", IEEE Design and Test of Computers, pp 14-22, January 2004. Incremental timing analysis is also described in U.S. Pat. No. 5,508,937; R. P. Abato, A. D. Drumm, D. J. Hathaway, and L. P. P. P. van Ginneken, "Incremental timing analysis", Apr. 16, 1996.) In one example embodiment, an initial timing analysis is completed on the current design before the layer swapping process of method 600 begins. In one example embodiment, a directed timing graph representing the nets of the layout and the circuits of the design is annotated with information, such as the amount of slack and slew rates at each point along the graph (operation 1704). In response to a request to investigate a layer swap, a layer change is temporarily made in the design model for the net under analysis (operation 1708). The data model flags which edge in the timing graph corresponds to the net having the new layer change and the flagged edge is invalidated (operation 1712). An incremental timer is then queried for the timing slack on the net (operation 1716). The incremental timer traces forward through the directed timing graph to the timing testpoints which may be effected and then searches backwards through the directed timing graph to find any invalidated nodes and edges (operation 1720). When it encounters the invalidated edge corresponding to the net with the changed layer, it requests new parasitic information for the net (operation 1724). A new RC graph representing the net's parasitic values is generated based on the net's global routing topology and the resistance and capacitance per unit length of the new layer (operation 1728). The new RC graph is then analyzed to calculate the net's new load capacitance and the time to propagate a signal through the net (wire delay) (operation 1732). The incremental timer then uses the new information to propagate new arrival times forward in the directed timing graph to the final testpoints where a new timing slack can be calculated based on the change in arrival time (operation 1736).

FIG. 8 is a table illustrating test results of performing promotion with swap and promotion without swap, in accordance with an example embodiment. The parameter wACE4 is a measure of routability of the design. The parameter TNS (Total Negative Slack) is a measure that sums the slack of all failing testpoints. The parameter Worst Slack is the largest deviation from the acceptable timing. The parameter # Neg is the number of failing timing testpoints (testpoints with negative slack). The parameters TNS and # Neg are used to assess how many timing testpoints are failing their timing goal. As illustrated in FIG. 8, the Worst Slack measurement showed an improvement of 30.52% with swap as compared to without the swap mechanism. The parameters TNS and # Neg showed improvements of 6.15% and 0.39% respectively, while the parameter wACE4 showed a decline of 1%.

In one aspect, an exemplary method includes the operations of sorting one or more nets of a netlist based on an amount of slack (operation 604); selecting, as a current target net, a net of the one or more nets that is unprocessed and that has a least amount of slack (operation 608); selecting a layer 400 of a higher bucket that is unprocessed for the currently selected target net, the higher bucket being higher than a bucket of the current target net (operation 612); determining if capacity is available to route the current target net on the selected layer of the higher bucket (operation 616); routing the current target net on the selected layer of the higher bucket in response to capacity being available (operation 620); and identifying, as candidate nets, one or more nets that are competing for resources with the current target net on the selected layer of the higher bucket in response to capacity not being available (operation 624).

In one aspect, a computer (see discussion of FIG. 12 below) includes a memory; and at least one processor, coupled to the memory, and operative to perform operations including: sorting one or more nets of a netlist based on an amount of slack (operation 604); selecting, as a current target net, a net of the one or more nets that is unprocessed and that has a least amount of slack (operation 608); selecting a layer 400 of a higher bucket that is unprocessed for the currently selected target net, the higher bucket being higher than a bucket of the current target net (operation 612); determining if capacity is available to route the current target net on the selected layer of the higher bucket (operation 616); routing the current target net on the selected layer of the higher bucket in response to capacity being available (operation 620); and identifying, as candidate nets, one or more nets that are competing for resources with the current target net on the selected layer of the higher bucket in response to capacity not being available (operation 624).

In one aspect, non-transitory computer readable medium including computer executable instructions which when executed by a computer performing electronic design analysis cause the computer to perform a method which improves the performance of the computer, the method including operations of: sorting one or more nets of a netlist based on an amount of slack (operation 604); selecting, as a current target net, a net of the one or more nets that is unprocessed and that has a least amount of slack (operation 608); selecting a layer 400 of a higher bucket that is unprocessed for the currently selected target net, the higher bucket being higher than a bucket of the current target net (operation 612); determining if capacity is available to route the current target net on the selected layer of the higher bucket (operation 616); routing the current target net on the selected layer of the higher bucket in response to capacity being available (operation 620); and identifying, as candidate nets, one or more nets that are competing for resources with the current target net on the selected layer of the higher bucket in response to capacity not being available (operation 624).

In one example embodiment, a sensitivity of each candidate net is estimated, the estimate being a prediction of a change in a slack that would be encountered by demoting a corresponding candidate net (operation 628), and sorting the candidate nets by the estimated sensitivity in order of increasing sensitivity (operation 632). In one example embodiment, the current target net and a least sensitive candidate net that has not yet been swapped with the current target net are swapped, the swapped nets are routed, and new slack measurements for the current target net and the swapped candidate net are determined (operation 636). In one example embodiment, a determination is made of whether swap criteria is met (operation 640) and the swap is undone in response to the swap criteria not being met (operation 644); and the swap is maintained in response to the swap criteria being met (operation 648). In one example embodiment, the swap criteria is a slack for the current target net being equal to or less than a design threshold, a slack for the swapped candidate net being equal to or less than the design threshold, and a tile edge overflow being decreased. In one example embodiment, the determining, routing, and identifying operations are repeated for each candidate net and each layer of a higher bucket.

As noted, in one or more embodiments, the layout is instantiated as a design structure. See discussion of FIG. 9. A physical integrated circuit is then fabricated in accordance with the design structure. See again discussion of FIG. 9. Refer also to FIG. 10. Once the physical design data is obtained, based, in part, on the analytical processes described herein, an integrated circuit designed in accordance therewith can be fabricated according to known processes that are generally described with reference to FIG. 10. Generally, a wafer with multiple copies of the final design is fabricated and cut (i.e., diced) such that each die is one copy of the integrated circuit. At block 810, the processes include fabricating masks for lithography based on the finalized physical layout. At block 820, fabricating the wafer includes using the masks to perform photolithography and etching. Once the wafer is diced, testing and sorting each die is performed at 830 to filter out any faulty die.

Figure 12:
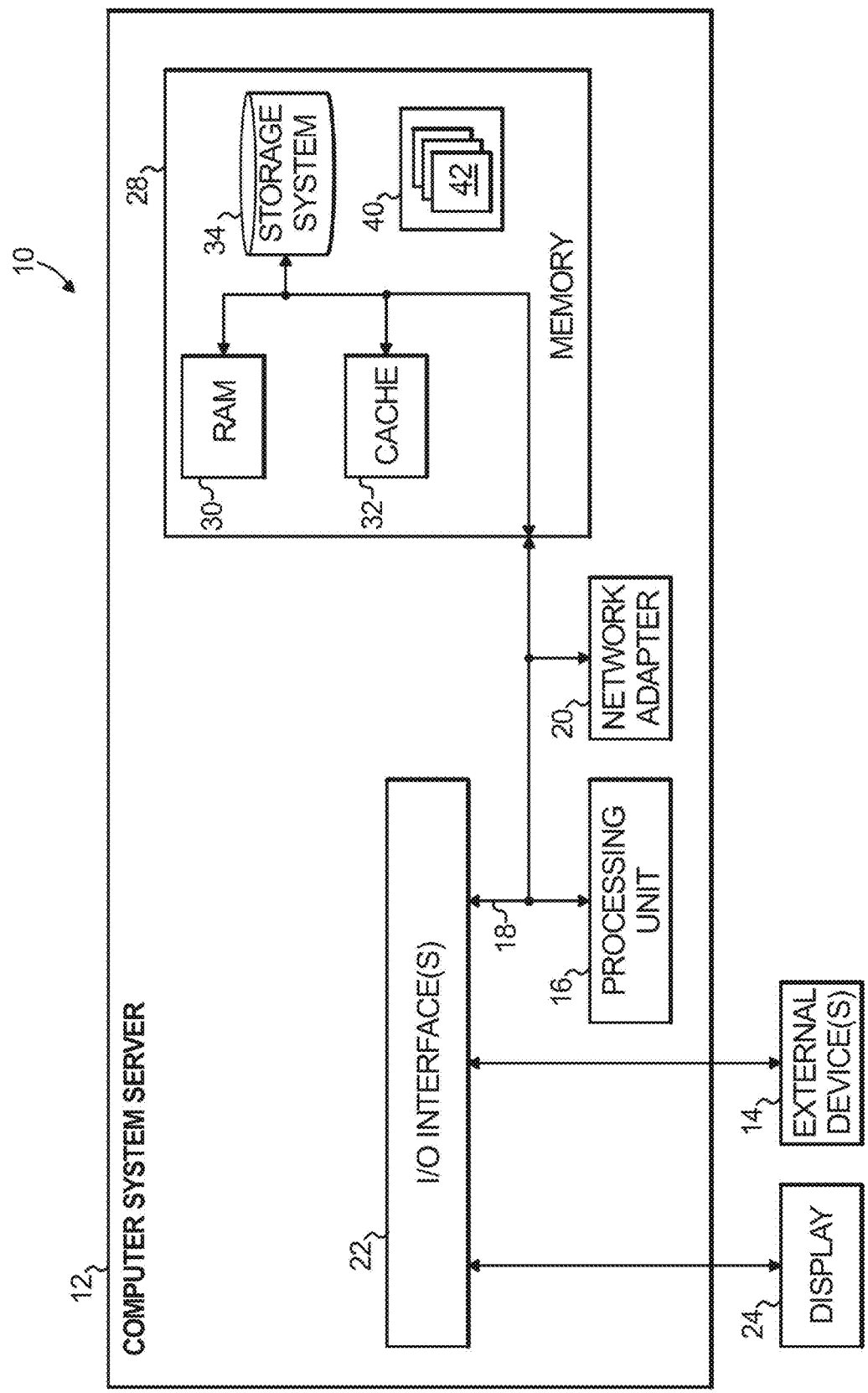
FIG. 12 depicts a computer system that may be useful in implementing one or more aspects and/or elements of the invention.

One or more embodiments include a computer including a memory 28; and at least one processor 16, coupled to the memory, and operative to carry out or otherwise facilitate any one, some, or all of the method steps described herein (as depicted in FIG. 12).

Figure 9:
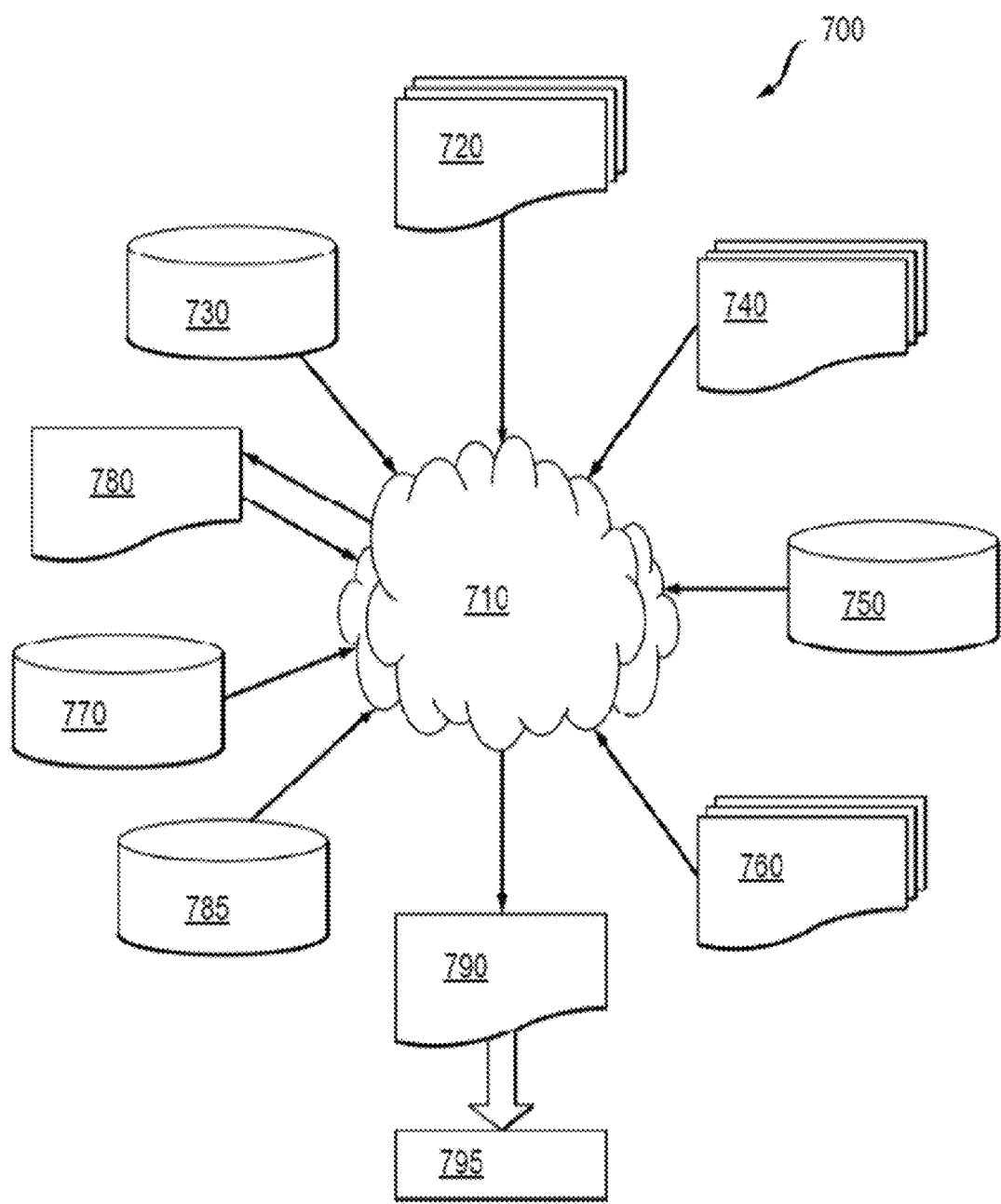
FIG. 9 is a flow diagram of a design process used in semiconductor design, manufacture, and/or test.
Figure 10:
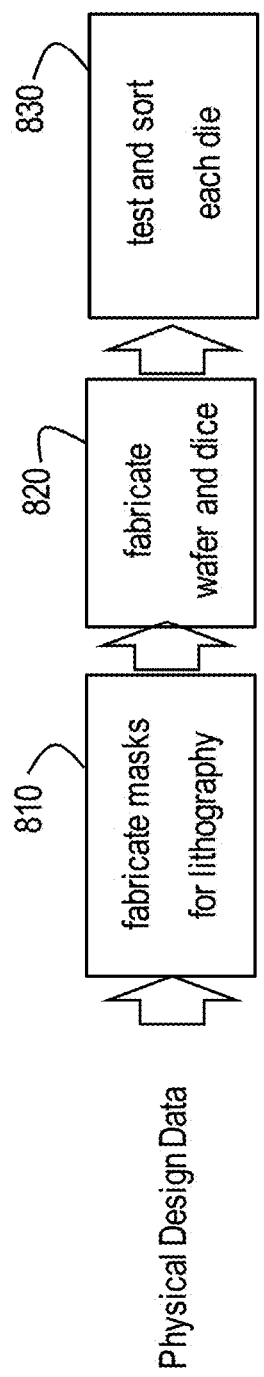
FIG. 10 shows further aspects of IC fabrication from physical design data.

Furthermore, referring to FIG. 9, in one or more embodiments the at least one processor is operative to generate a design structure for the integrated circuit design in accordance with the analysis, and in at least some embodiments, the at least one processor is further operative to control integrated circuit manufacturing equipment to fabricate a physical integrated circuit in accordance with the design structure. Thus, the layout can be instantiated as a design structure, and the design structure can be provided to fabrication equipment to facilitate fabrication of a physical integrated circuit in accordance with the design structure. The physical integrated circuit will be improved due to the routing of higher performance interconnects (nets) and improved integrated circuit design density (fewer layers of metal are required, improving chip manufacturing yields and costs to manufacture) compared to circuits designed using prior art techniques.

Figure 11:
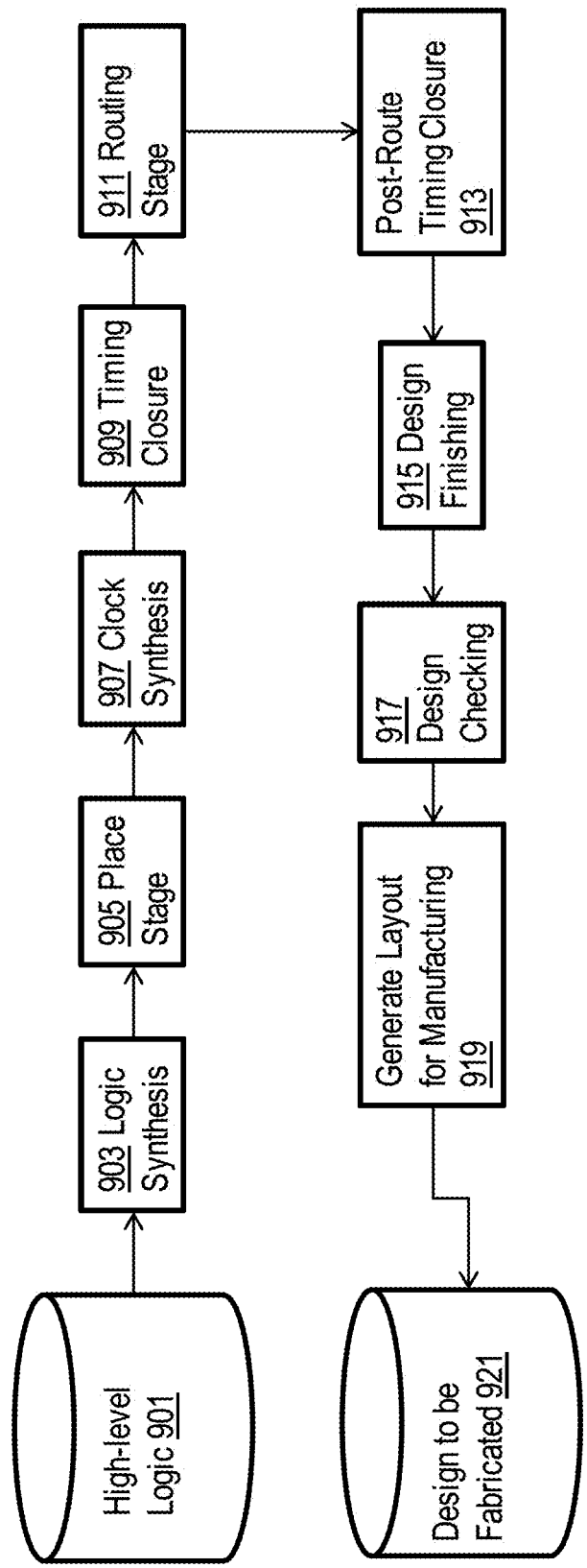
FIG. 11 shows an exemplary high-level Electronic Design Automation (EDA) tool flow, within which aspects of the invention can be employed.

FIG. 11 depicts an example high-level Electronic Design Automation (EDA) tool flow, which is responsible for creating an optimized microprocessor (or other IC) design to be manufactured. A designer could start with a high-level logic description 901 of the circuit (e.g. VHDL or Verilog). The logic synthesis tool 903 compiles the logic, and optimizes it without any sense of its physical representation, and with estimated timing information. The placement tool 905 takes the logical description and places each component, looking to minimize congestion in each area of the design. The clock synthesis tool 907 optimizes the clock tree network by cloning/balancing/buffering the latches or registers. The timing closure step 909 performs a number of optimizations on the design, including buffering, wire tuning, and circuit repowering; its goal is to produce a design which is routable, without timing violations, and without excess power consumption. The routing stage 911 takes the placed/optimized design, and determines how to create wires to connect all of the components, without causing manufacturing violations. Post-route timing closure 913 performs another set of optimizations to resolve any violations that are remaining after the routing. Design finishing 915 then adds extra metal shapes to the netlist, to conform with manufacturing requirements. The checking steps 917 analyze whether the design is violating any requirements such as manufacturing, timing, power, electromigration or noise, and the like. When the design is clean, the final step 919 is to generate a layout for the design, representing all the shapes to be fabricated in the design to be fabricated 921.

One or more embodiments of the invention, or elements thereof, can be implemented in the form of an apparatus including a memory and at least one processor that is coupled to the memory and operative to perform exemplary method steps. FIG. 12 depicts a computer system that may be useful in implementing one or more aspects and/or elements of the invention; it is referred to herein as a cloud computing node but is also representative of a server, general purpose-computer, etc. which may be provided in a cloud or locally.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 12, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 12) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Exemplary Design Process Used in Semiconductor Design, Manufacture, and/or Test

One or more embodiments integrate the characterizing and simulating techniques herein with semiconductor integrated circuit design simulation, test, layout, and/or manufacture. In this regard, FIG. 9 shows a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of design structures and/or devices, such as those that can be analyzed using techniques disclosed herein or the like. The design structures processed and/or generated by design flow 700 may be encoded on machine-readable storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 9 illustrates multiple such design structures including an input design structure 720 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a gate array or storage medium or the like, design structure 720 may be accessed and processed by one or more hardware and/or software modules within design process 710 to simulate or otherwise functionally represent an electronic component, circuit, electronic or logic module, apparatus, device, or system. As such, design structure 720 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of components, circuits, devices, or logic structures to generate a Netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable data storage medium or programmed into a programmable gate array. The medium may be a nonvolatile storage medium such as a magnetic or optical disk drive, a programmable gate array, a compact flash, or other flash memory. Additionally, or in the alternative, the medium may be a system or cache memory, buffer space, or other suitable memory.

Design process 710 may include hardware and software modules for processing a variety of input data structure types including Netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on data storage media and that when processed by an ECAD system generate a logically or otherwise functionally equivalent form of one or more IC designs or the like. In one embodiment, design structure 790 may comprise a compiled, executable HDL simulation model that functionally simulates the devices to be analyzed.

Design structure 790 may also employ a data format used for the exchange of layout data of integrated circuits and/or symbolic data format (e.g. information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described herein (e.g., .lib files). Design structure 790 may then proceed to a stage 795 where, for example, design structure 790: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of improving the performance of a computer performing an electronic design, comprising:
    sorting one or more nets of a netlist based on an amount of slack;
    selecting, as a current target net, a net of the one or more nets that is unprocessed and that has a least amount of slack;
    selecting a layer of a higher bucket that is unprocessed for the currently selected target net, the higher bucket being higher than a bucket of the current target net;
    determining if capacity is available to route the current target net on the selected layer of the higher bucket;
    routing the current target net on the selected layer of the higher bucket in response to capacity being available; and
    identifying, as candidate nets, one or more nets that are competing for resources with the current target net on the selected layer of the higher bucket in response to capacity not being available.

2. The method of claim 1, further comprising estimating a sensitivity of each candidate net, the estimate being a prediction of a change in a slack that would be encountered by demoting a corresponding candidate net, and sorting the candidate nets by the estimated sensitivity in order of increasing sensitivity.

3. The method of claim 2, wherein the estimating the sensitivity further comprises performing an incremental parasitic and timing analysis using a directed timing graph annotated with timing information, the directed timing graph representing the nets of the netlist and circuits of the electronic design.

4. The method of claim 1, further comprising swapping the current target net and a least sensitive candidate net that has not yet been swapped with the current target net, routing the swapped nets, and determining new slack measurements for the current target net and the swapped candidate net.

5. The method of claim 1, further comprising determining if swap criteria is met and:
    undoing the swap in response to the swap criteria not being met; and
    maintaining the swap in response to the swap criteria being met.

6. The method of claim 1, wherein the swap criteria is a slack for the current target net being equal to or less than a design threshold, a slack for the swapped candidate net being equal to or less than the design threshold, and a tile edge overflow being decreased.

7. The method of claim 1, further comprising repeating the determining, routing, and identifying operations for each candidate net and each layer of a higher bucket.

8. A computer comprising:
    a memory; and
    at least one processor, coupled to said memory, and operative to perform operations comprising:
        sorting one or more nets of a netlist based on an amount of slack;
        selecting, as a current target net, a net of the one or more nets that is unprocessed and that has a least amount of slack;
        selecting a layer of a higher bucket that is unprocessed for the currently selected target net, the higher bucket being higher than a bucket of the current target net;
        determining if capacity is available to route the current target net on the selected layer of the higher bucket;
        routing the current target net on the selected layer of the higher bucket in response to capacity being available; and
        identifying, as candidate nets, one or more nets that are competing for resources with the current target net on the selected layer of the higher bucket in response to capacity not being available.

9. The computer of claim 8, the operations further comprising estimating a sensitivity of each candidate net, the estimate being a prediction of a change in a slack that would be encountered by demoting a corresponding candidate net, and sorting the candidate nets by the estimated sensitivity in order of increasing sensitivity.

10. The computer of claim 9, wherein the estimating the sensitivity further comprises performing an incremental parasitic and timing analysis using a directed timing graph annotated with timing information, the directed timing graph representing the nets of the netlist and circuits of the electronic design.

11. The computer of claim 8, the operations further comprising swapping the current target net and a least sensitive candidate net that has not yet been swapped with the current target net, routing the swapped nets, and determining new slack measurements for the current target net and the swapped candidate net.

12. The computer of claim 8, the operations further comprising determining if swap criteria is met and:
 undoing the swap in response to the swap criteria not being met; and
 maintaining the swap in response to the swap criteria being met.

13. The computer of claim 8, wherein the swap criteria is a slack for the current target net being equal to or less than a design threshold, a slack for the swapped candidate net being equal to or less than the design threshold, and a tile edge overflow being decreased.

14. The computer of claim 8, the operations further comprising repeating the determining, routing, and identifying operations for each candidate net and each layer of a higher bucket.

15. A non-transitory computer readable medium comprising computer executable instructions which when executed by a computer performing electronic design analysis cause the computer to perform a method which improves the performance of the computer, the method comprising operations of:
 sorting one or more nets of a netlist based on an amount of slack;
 selecting, as a current target net, a net of the one or more nets that is unprocessed and that has a least amount of slack;
 selecting a layer of a higher bucket that is unprocessed for the currently selected target net, the higher bucket being higher than a bucket of the current target net;
 determining if capacity is available to route the current target net on the selected layer of the higher bucket;
 routing the current target net on the selected layer of the higher bucket in response to capacity being available; and
 identifying, as candidate nets, one or more nets that are competing for resources with the current target net on the selected layer of the higher bucket in response to capacity not being available.

16. The non-transitory computer readable medium of claim 15, the operations further comprising estimating a sensitivity of each candidate net, the estimate being a prediction of a change in a slack that would be encountered by demoting a corresponding candidate net, and sorting the candidate nets by the estimated sensitivity in order of increasing sensitivity.

17. The non-transitory computer readable medium of claim 16, wherein the estimating the sensitivity further comprises performing an incremental parasitic and timing analysis using a directed timing graph annotated with timing information, the directed timing graph representing the nets of the netlist and circuits of the electronic design.

18. The non-transitory computer readable medium of claim 15, the operations further comprising swapping the current target net and a least sensitive candidate net that has not yet been swapped with the current target net, routing the swapped nets, and determining new slack measurements for the current target net and the swapped candidate net.

19. The non-transitory computer readable medium of claim 15, the operations further comprising determining if swap criteria is met and:
 undoing the swap in response to the swap criteria not being met; and
 maintaining the swap in response to the swap criteria being met.

20. The non-transitory computer readable medium of claim 15, wherein the swap criteria is a slack for the current target net being equal to or less than a design threshold, a slack for the swapped candidate net being equal to or less than the design threshold, and a tile edge overflow being decreased.

* * * * *